US012087182B2

(12) United States Patent
Sklaris

(10) Patent No.: US 12,087,182 B2
(45) Date of Patent: Sep. 10, 2024

(54) FLAG RAISING DEVICE

(71) Applicant: Ronald Sklaris, Henderson, NV (US)

(72) Inventor: Ronald Sklaris, Henderson, NV (US)

( * ) Notice: Subject to any disclaimer, the term of this patent is extended or adjusted under 35 U.S.C. 154(b) by 225 days.

(21) Appl. No.: 17/748,485

(22) Filed: May 19, 2022

(65) Prior Publication Data

US 2023/0377492 A1 Nov. 23, 2023

(51) Int. Cl.
*G09F 17/00* (2006.01)

(52) U.S. Cl.
CPC ...... *G09F 17/00* (2013.01); *G09F 2017/0025* (2013.01)

(58) Field of Classification Search
CPC .......................... G09F 17/00; G09F 2017/0025
See application file for complete search history.

(56) References Cited

U.S. PATENT DOCUMENTS 412,117 A * 10/1889 Poire ........................ G09F 17/00 116/173
1,048,291 A * 12/1912 Buckley .................. G09F 17/00 116/174
1,106,309 A * 8/1914 Joyce et al. ............ F16G 15/04 292/281
1,107,934 A * 8/1914 Hagan .................... A62B 35/04 188/65.1
1,324,439 A * 12/1919 Walpuski et al. ....... G09F 17/00 116/173
1,373,376 A 3/1921 Zipoy
1,463,456 A * 7/1923 Bear ........................ D06F 53/00 24/129 R
1,547,416 A * 7/1925 Edwards ................. G09F 17/00 116/173
1,645,691 A * 10/1927 Davis ....................... E04H 12/32 116/173
1,760,337 A * 5/1930 Bernardin ............... E04H 12/32 116/173
2,011,532 A * 8/1935 Wanser, Sr. ............. B63B 21/08 114/218
2,327,056 A * 8/1943 Nelson ..................... E04H 12/32 116/173
3,417,732 A * 12/1968 PLatt, Jr. ................ G09F 17/00 52/146

(Continued)

FOREIGN PATENT DOCUMENTS

WO WO9709500 3/1997

OTHER PUBLICATIONS

CN-202249095-U; Chen, "Flag" 2012. (Year: 2012).*

*Primary Examiner* — Kristina M Deherrera
*Assistant Examiner* — Tania Courson

(57) ABSTRACT

A flag raising device for raising a flag up a pole using a line that can be conveniently decoupled from the pole includes a top pulley rotatably coupled to a pole proximate a top end of the pole. A line is positioned to define a loop, the line frictionally engaging the top pulley and a bottom pulley and is movable about the loop. A hook is coupled to the pole proximate a bottom end of the pole. An attachment member is coupled to the bottom pulley and securable to the hook. A pair of clips is coupled to the line and is positioned to be configured to raise and lower the flag to a flying position and a servicing position respectively when the line moves about the loop.

5 Claims, 4 Drawing Sheets

(56) References Cited

U.S. PATENT DOCUMENTS

| | | | | | |
|---|---|---|---|---|---|
| 3,826,223 | A * | 7/1974 | Lingo, Jr. | G09F 17/00 24/598.5 |
| 3,923,001 | A | 12/1975 | Murdock | |
| 3,976,283 | A | 8/1976 | Schmit | |
| D250,571 | S * | 12/1978 | Winslow | D8/358 |
| 5,096,022 | A * | 3/1992 | Bowers | G09F 17/00 188/65.1 |
| 5,315,955 | A * | 5/1994 | Feliz | G09F 17/00 116/173 |
| D362,614 | S * | 9/1995 | Kingery | D8/360 |
| 6,155,018 | A | 12/2000 | Yang | |
| 6,401,309 | B1 * | 6/2002 | Yang | F16G 11/046 24/130 |
| D506,126 | S * | 6/2005 | Amy | D8/382 |
| 7,428,769 | B2 * | 9/2008 | Fontaine | F16G 11/103 24/130 |
| 7,562,862 | B1 * | 7/2009 | Jackson | B66D 3/14 254/391 |
| 7,735,809 | B2 * | 6/2010 | Maire | B66D 3/06 24/130 |
| 7,891,058 | B2 * | 2/2011 | Kubli | B63B 21/04 24/129 R |
| 8,286,575 | B2 * | 10/2012 | Somers | G09F 17/00 116/173 |

* cited by examiner

FLAG RAISING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to flag raising devices and more particularly pertains to a new flag raising device for raising a flag up a pole using a line that can be conveniently decoupled from the pole.

(2) Description of Related Art Including Information Disclosed Under 37 CFR 1.97 and 1.98

The prior art relates to flag raising devices using pulleys fixed relative to a flagpole. The prior art does not relate to a flag raising device using a pulley that is removably couplable to the flagpole, which is a convenient means of modifying a flagpole that requires the line carrying the flag to be tied to the flag pole after the flag is moved to a desired position.

BRIEF SUMMARY OF THE INVENTION

An embodiment of the disclosure meets the needs presented above by generally comprising a top pulley rotatably coupled to a pole proximate a top end of the pole. A line is positioned to define a loop, the line frictionally engaging the top pulley and a bottom pulley and is movable about the loop. A pair of clips is coupled to the line and is positioned to be configured to be couplable to a flag. A hook is coupled to the pole proximate a bottom end of the pole and extends laterally from the pole and downward. An attachment member is coupled to the bottom pulley and positionable adjacent a saddle surface of the hook such that the line undergoes a tension force. The attachment member is also secured to the saddle surface by the tension force. The pair of clips is coupled to the line and is positioned to be configured to raise and lower the flag to a flying position and a servicing position respectively when the line moves about the loop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
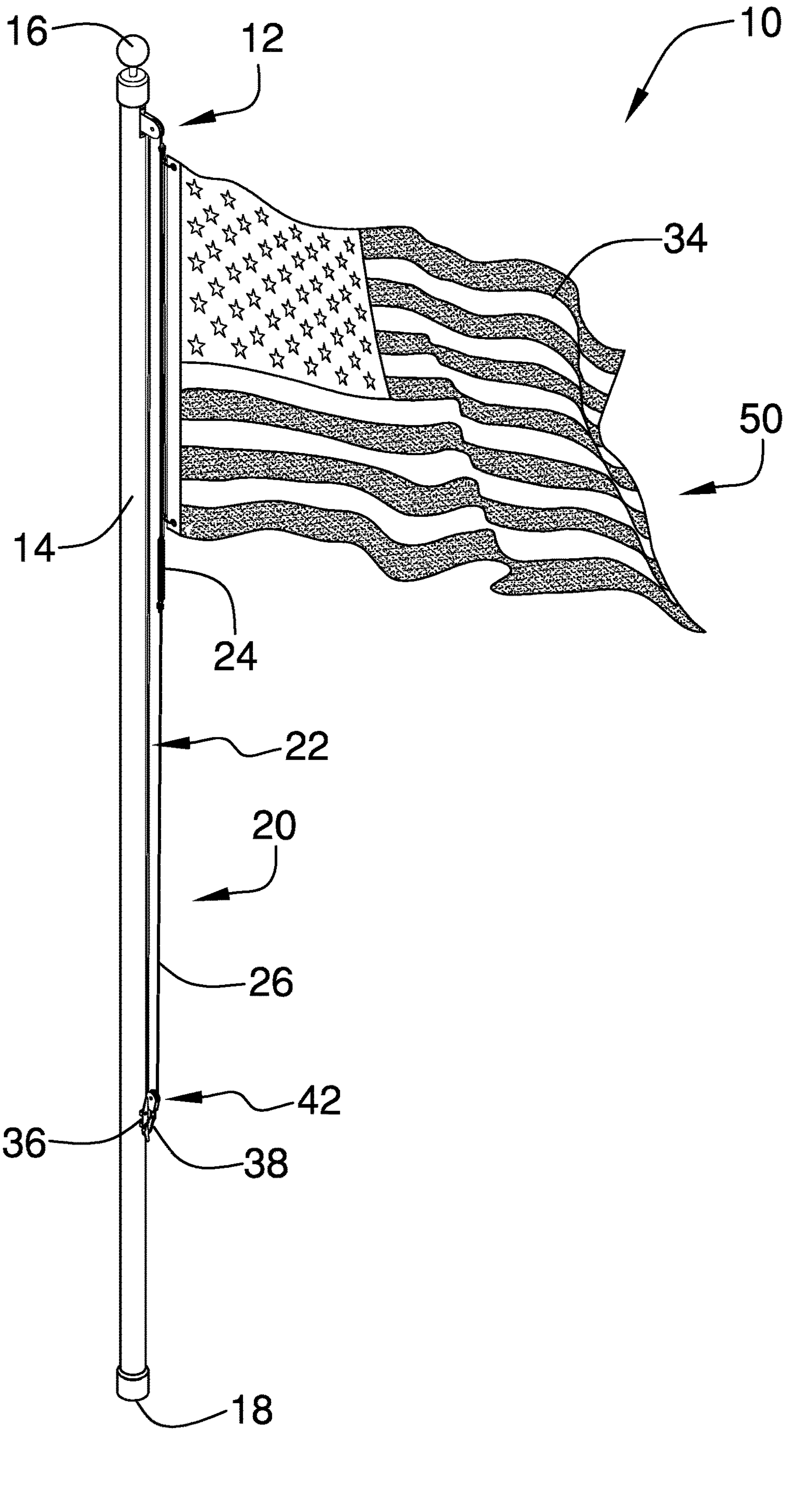
FIG. 1 is a top front side perspective view of a flag raising device according to an embodiment of the disclosure wherein the flag is in a flying position.
Figure 2:
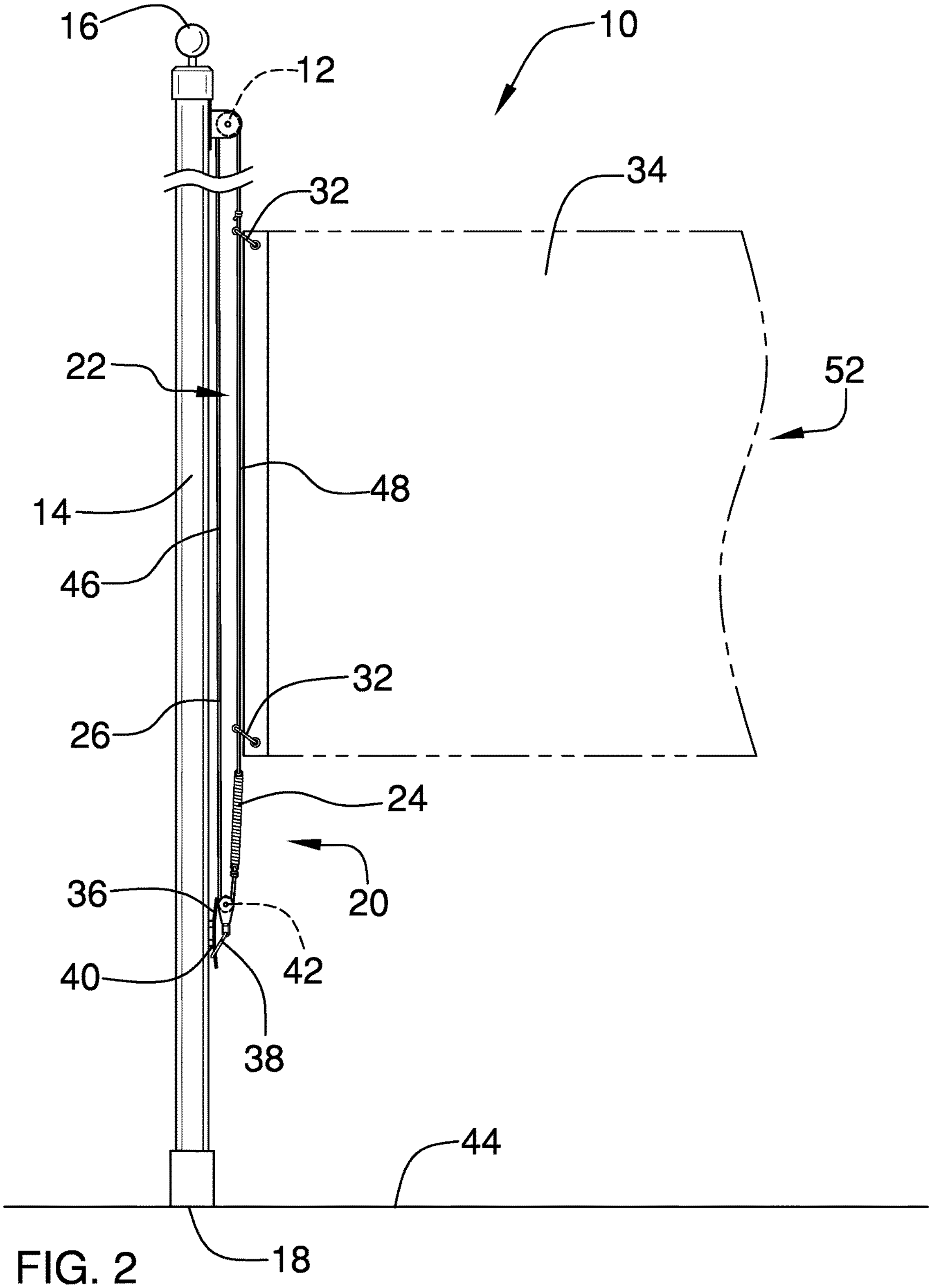
FIG. 2 is a front view of an embodiment of the disclosure wherein the flag is in a servicing position.
Figure 3:
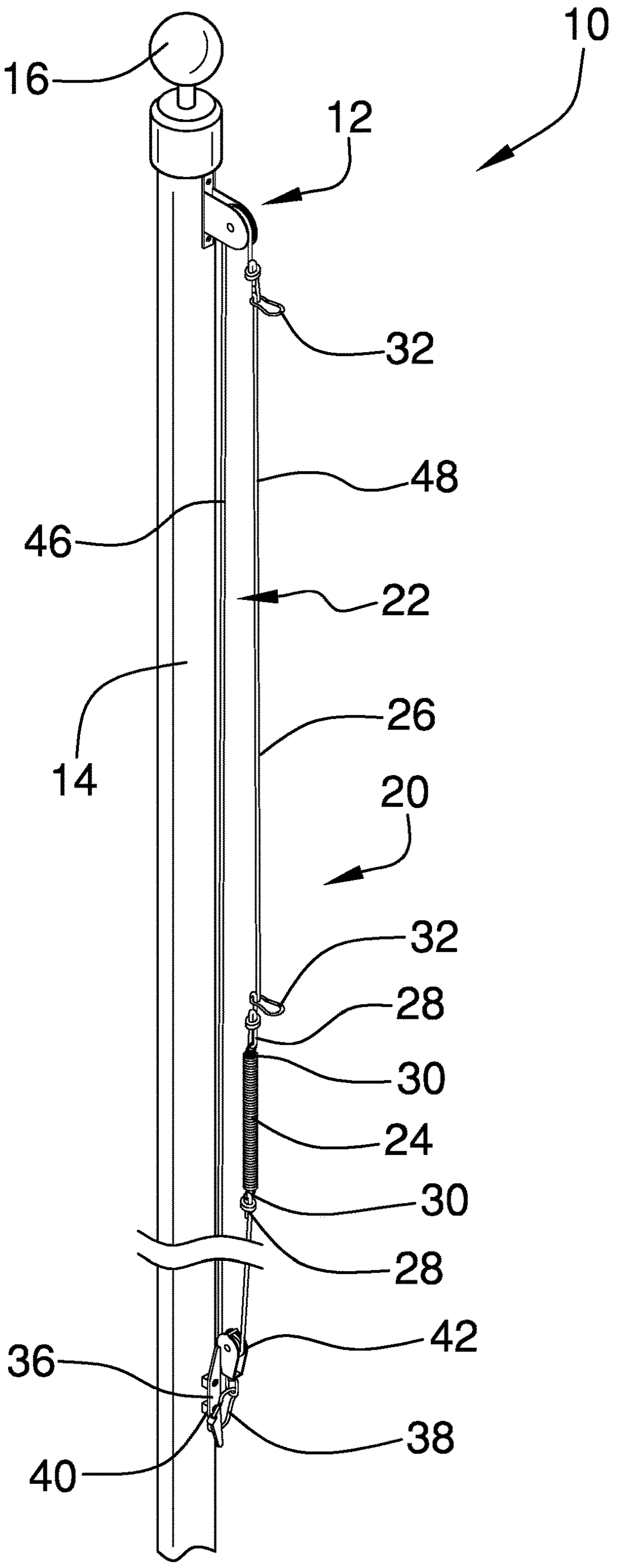
FIG. 3 is a top front side perspective view of an embodiment of the disclosure wherein the attachment clips are raised such that an attached flag would be in a flying position.
Figure 4:
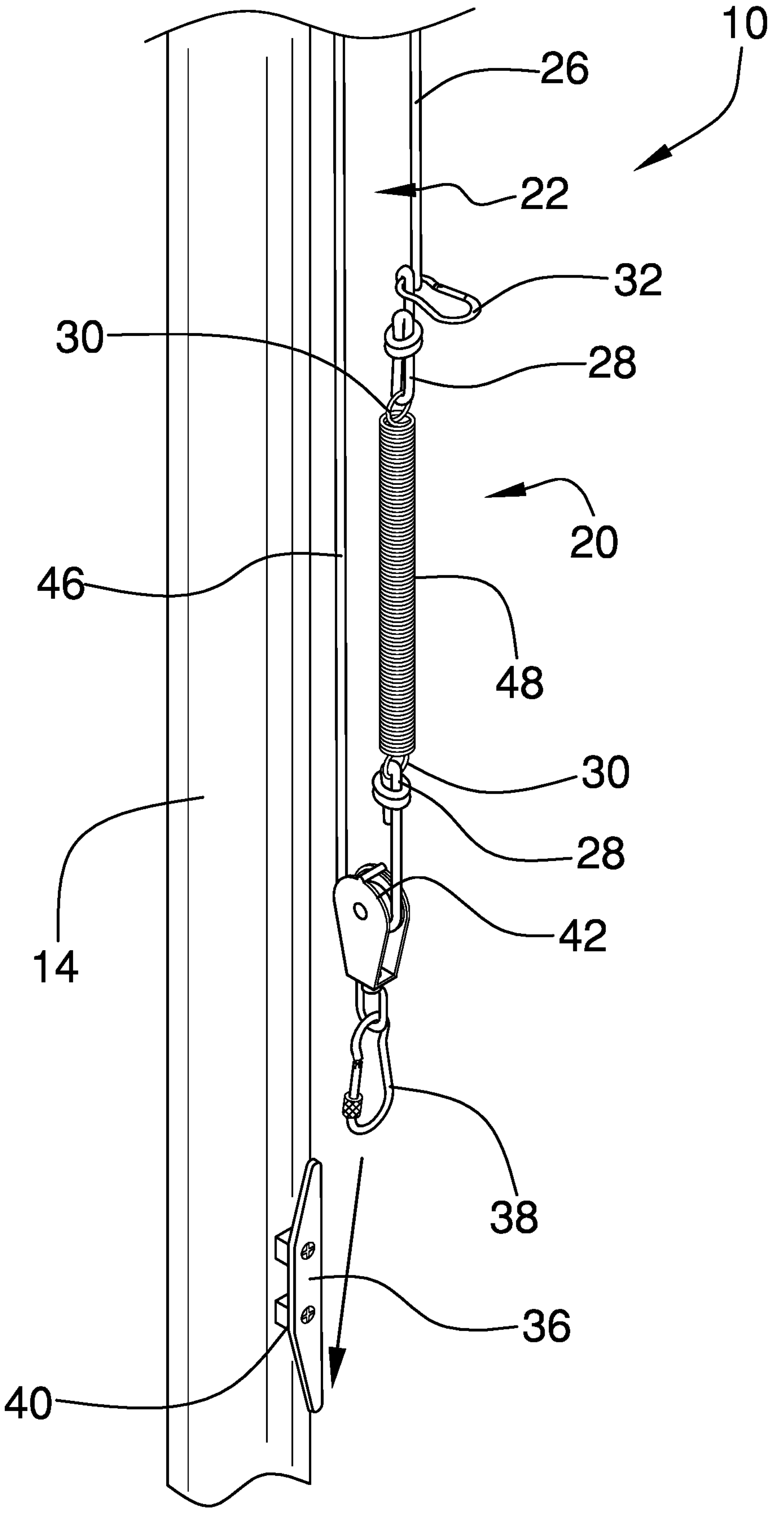
FIG. 4 is a detail perspective view of an embodiment of the disclosure.

With reference now to the drawings, and in particular to FIGS. 1 through 4 thereof, a new flag raising device embodying the principles and concepts of an embodiment of the disclosure and generally designated by the reference numeral 10 will be described.

As best illustrated in FIGS. 1 through 6, the flag raising device 10 generally comprises a top pulley 12 rotatably coupled to a pole 14 proximate a top end 16 of the pole 14, the top pulley 12 has a horizontal rotational axis and is positioned laterally from said pole 14. A line 20 is positioned to define a loop 22 and comprises a tension spring 24 and a cord 26, wherein the cord 26 has a pair of ends 28, each end 28 being coupled to an associated end 30 of the tension spring 24. The line 20 frictionally engages the top pulley 12 and a bottom pulley 42 and is movable about the loop 22. A pair of clips 32 is coupled to the line 20 and is positioned to be configured to be couplable to a flag 34.

A hook 36 is coupled to the pole 14 proximate a bottom end 18 of the pole 14 and is positioned to be configured to be reachable by a user standing on a mounting surface 44 adjacent to the bottom end 18 of the pole 14. The hook 36 extends 28 laterally from the pole 14 and downward. An attachment member 38 is coupled to the bottom pulley 42 and is positionable adjacent a saddle surface 40 of the hook 36. The line 20 is secured to the saddle surface 40 by a tension force undergone by the line 20 when the attachment member 38 is positioned adjacent to the saddle surface 40.

When the attachment member 38 is positioned adjacent the saddle surface 40, the bottom pulley 42 has a rotational axis oriented horizontally. The line 20 also has an inner portion 46 and an outer portion 48 when the attachment member 38 is positioned adjacent the saddle surface 40, wherein the inner portion 46 is closer to the pole 14 than the outer portion 48 and both the inner portion 46 and the outer portion 48 are substantially vertical. The pair of clips 32 are coupled to the outer portion 48 of the line 20 such that the pair of clips 32 is positioned to be configured to raise and lower the flag 34 to a flying position 50 and a servicing position 52 respectively when the line 20 moves about the loop 22.

In use, the attachment member 38 is positioned adjacent the saddle surface 40 of the hook 36 such that the line 20 is secured to the hook 36 by a tension force. The attachment member 38 can be conveniently removed from this position for repositioning of the line 20 or to easily access and service the line 20, the bottom pulley 42 or the attachment member 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A flag raising device comprising:

a pole;

a top pulley being rotatably coupled to said pole proximate a top end of said pole;

a bottom pulley;

a line being positioned to define a loop, said line frictionally engaging each of said top pulley and said bottom pulley, said line being movable about said loop;

a pair of clips coupled to said line, said pair of clips being positioned to be configured to be couplable to a flag;

a hook coupled to said pole proximate a bottom end of said pole, said hook extending laterally from said pole and downward; and an attachment member coupled to said bottom pulley and positionable adjacent a saddle surface of said hook, said line undergoing a tension force when said attachment member is positioned adjacent to said saddle surface, said attachment member being secured to said saddle surface by the tension force;

wherein said pair of clips is coupled to said line, said pair of clips being positioned to be configured to raise and lower the flag to a flying position and a servicing position respectively when said line moves about said loop;

wherein said line further comprises a tension spring and a cord, said cord having a pair of ends, each end being coupled to an associated end of said tension spring;

wherein said line has an inner portion and an outer portion when said attachment member is positioned adjacent said saddle surface, said inner portion being closer to said pole than said outer portion, both said inner portion and said outer portion being substantially vertical, wherein said pair of clips is coupled to said outer portion of said line; and wherein said tension spring is positioned on said outer portion of said line and a lower clip of said pair of clips is positioned proximate to a top end of said tension spring.

2. The device of claim 1, wherein said top pulley has a horizontal rotational axis and being positioned laterally from said pole.

3. The device of claim 1, wherein said hook is positioned to be configured to be reachable by a user standing on a mounting surface adjacent to said bottom end of said pole.

4. The device of claim 1, wherein said bottom pulley has a rotational axis, said rotational axis of said bottom pulley being horizontal when said attachment member is positioned adjacent said saddle surface.

5. A flag raising device comprising:

a pole;

a top pulley being rotatably coupled to said pole proximate a top end of said pole, said top pulley having a horizontal rotational axis and being positioned laterally from said pole;

a bottom pulley;

a line comprising a tension spring and a cord, said cord having a pair of ends, each end being coupled to an associated end of said tension spring, said line being positioned to define a loop, said line frictionally engaging each of said top pulley and said bottom pulley, said line being movable about said loop;

a pair of clips coupled to said line, said pair of clips being positioned to be configured to be couplable to a flag;

a hook coupled to said pole proximate a bottom end of said pole, said hook being positioned to be configured to be reachable by a user standing on a mounting surface adjacent to said bottom end of said pole, said hook extending laterally from said pole and downward;

an attachment member coupled to said bottom pulley and positionable adjacent a saddle surface of said hook, said line undergoing a tension force when said attachment member is positioned adjacent to said saddle surface, said attachment member being secured to said saddle surface by the tension force;

wherein said bottom pulley has a rotational axis, said rotational axis of said bottom pulley being horizontal when said attachment member is positioned adjacent said saddle surface;

wherein said line has an inner portion and an outer portion when said attachment member is positioned adjacent said saddle surface, said inner portion being closer to said pole than said outer portion, both said inner portion and said outer portion being substantially vertical;

wherein said pair of clips is coupled to said outer portion of said line, said pair of clips being positioned to be configured to raise and lower the flag to a flying position and a servicing position respectively when said line moves about said loop; and wherein said tension spring is positioned on said outer portion of said line and a lower clip of said pair of clips is positioned proximate to a top end of said tension spring.

* * * * *